United States Patent [19]
Valenta

[11] Patent Number: 5,483,070
[45] Date of Patent: Jan. 9, 1996

[54] SCINTILLATION COUNTER

[75] Inventor: Robert J. Valenta, West Chicago, Ill.

[73] Assignee: Packard Instrument Company, Downers Grove, Ill.

[21] Appl. No.: 284,938

[22] Filed: Aug. 2, 1994

[51] Int. Cl.$^6$ .................................................. G01T 1/202
[52] U.S. Cl. .......................... 250/366; 250/362; 250/364; 250/369
[58] Field of Search .................................... 250/366, 367, 250/362, 364, 369

[56] References Cited

U.S. PATENT DOCUMENTS

| | | | |
|---|---|---|---|
| 3,842,278 | 10/1974 | Noakes | 250/369 |
| 3,898,463 | 8/1975 | Noakes | 250/369 |
| 4,421,986 | 12/1983 | Friauf et al. | 250/369 |
| 4,528,450 | 7/1985 | Valenta | 250/369 |
| 4,651,006 | 3/1987 | Valenta | 250/369 |
| 4,833,326 | 5/1989 | Valenta et al. | 250/362 |
| 5,061,855 | 10/1991 | Ryuo | 250/361 R |
| 5,146,093 | 9/1992 | Valenta et al. | 250/362 |
| 5,317,158 | 5/1994 | McElhaney et al. | 250/367 |
| 5,347,129 | 9/1994 | Miller et al. | 250/369 |

FOREIGN PATENT DOCUMENTS

| | | | |
|---|---|---|---|
| 2626679 | 8/1989 | France . | |
| 5-341047 | 12/1993 | Japan | 250/367 |

OTHER PUBLICATIONS

Noakes "The role of auxiliary scintillators for gamma spectroscopy and low–level counting applications" Radiocarbon 1993, pp. 143–156.

Noakes "Low Background Liquid Scintillation Counting using an active sample holder and pulse discrimination electronics", Radiocarbon vol. 31, No. 3, 1989, pp. 332–341.

Bicron Corp. product bulletin SC–103A—BGO Detectors, 1989.

Crismatec product brochure on bismuth germanate crystals, no date.

JTT International flyer on bismuth germanate crystals, no date.

Primary Examiner—Carolyn E. Fields
Attorney, Agent, or Firm—Arnold, White & Durkee

[57] ABSTRACT

A scintillation measurement system for measuring optical events produced by scintillators in response to the radioactive decay of a constituent or constituents of a sample to be measured comprises a sample support for positioning a sample in a sample well; a bismuth germanate (BGO) scintillation crystal, such as $Bi_4 Ge_3 O_{12}$, located adjacent the sample well; a plurality of photodetectors located outside the bismuth germanate crystal for detecting optical events occurring in the sample well or in the bismuth germanate crystal and converting those optical events into electrical pulses; and a pulse analyzing system for receiving the electrical pulses from the photodetectors and determining whether such pulses represent $\alpha$, $\beta$ or $\gamma$ events. This system can be used with samples containing $\alpha$, $\beta$ and $\gamma$ emitters, or any combination thereof.

21 Claims, 8 Drawing Sheets 5,483,070

SCINTILLATION COUNTER

FIELD OF THE INVENTION

The present invention relates generally to scintillation counters for assaying the radioactivity of samples and, more particularly, to scintillation counters that are capable of assaying samples ,containing alpha ($\alpha$), beta ($\beta$) or gamma ($\gamma$) emitting radionuclides, and automatically determining which type of radiation is emitted by any given sample, as well as the activity level of such radiation.

SUMMARY OF THE INVENTION

It is a general object of the present invention to provide an improved scintillation counter which is capable of discriminating among scintillations produced by alpha ($\alpha$), beta ($\beta$) and gamma ($\gamma$) emissions (events) detected by common photodetectors, so that a single instrument can be used to measure all three kinds of radiation. A more particular object of the invention is to provide such a scintillation counter which permits reliable detection of weak beta emissions from a sample, and which also permits reliable detection of both weak and strong gamma emissions.

Other objects and advantages of the invention will be apparent from the following detailed description and the accompanying drawings.

In accordance with the present invention, the foregoing objectives are realized by providing a scintillation measurement system for measuring optical events produced by scintillators in response to the radioactive decay of a constituent or constituents of a sample to be measured, the system comprising: a sample support for positioning a sample in a sample well; a bismuth germanate (BGO) scintillation crystal, such as $Bi_4 Ge_3 O_{12}$, located adjacent the sample well; a plurality of photodetectors located outside the bismuth germanate crystal for detecting optical events occurring in the sample well or in the bismuth germanate crystal and converting those optical events into electrical pulses; and a pulse analyzing system for receiving the electrical pulses from the photodetectors and determining whether such pulses represent $\alpha$, $\beta$ or $\gamma$ events. This system can be used with samples containing $\alpha$, $\beta$ and $\gamma$ emitters, or any combination thereof.

The bismuth germanate crystal is transparent to scintillations emitted by a scintillator within the sample well so that such scintillations can be detected by the photodetectors. The primary purpose of the BGO scintillator is to detect radiation leaving the sample vial. Such radiation typically originates from a $\gamma$ emitter, because $\gamma$ rays are sufficiently strong that they are able to penetrate the sample vial and have sufficient energy to energize the BGO scintillator even though this scintillator is spaced a slight distance away from the sample.

The BGO scintillator is also used as an active guard shield to improve the ability of the counting system to discriminate between $\alpha$ or $\beta$ sample events being measured and unwanted background events. BGO crystals have a relatively high density which enables the solid scintillator to absorb a high percentage of the $\gamma$ rays impinging thereon, whether from the sample or from background events such as cosmic rays. This contributes to high $\gamma$ counting efficiency and enhanced background rejection.

The preferred pulse analyzing system includes a triggering circuit for receiving the electrical pulses from the photodetectors and determining which pulses are to be analyzed, and circuits responsive to the triggering circuit for determining the energy level of the electrical pulses, for filtering the electrical pulses and determining the time between the leading edges and the peaks of the filtered pulses (the "peak time"), for determining the number of pulses occurring within a selected time interval encompassing a pulse to be analyzed (the "burst count"), and for determining, in response to the pulse energy level, the peak time, and the burst count, the extent to which the electrical pulses should be treated as $\alpha$, $\beta$ or $\gamma$ events. At least a tentative decision as to whether a pulse represents an $\alpha$, $\beta$ or $\gamma$ event can be made by determining whether the peak time of a pulse correlates with an $\alpha$, $\beta$ or $\gamma$ event. The pulse measuring and evaluating circuits may be triggered in response to either the coincident detection of pulses at two photodetectors, or the detection of a burst of pulses at one or more photodetectors within a selected time interval.

BRIEF DESCRIPTION OF THE DRAWINGS

FIG. 6b is an enlarged perspective view of one half of the solid scintillator shown in FIG. 6a;

DETAILED DESCRIPTION OF THE PREFERRED EMBODIMENT

Figure 1A:
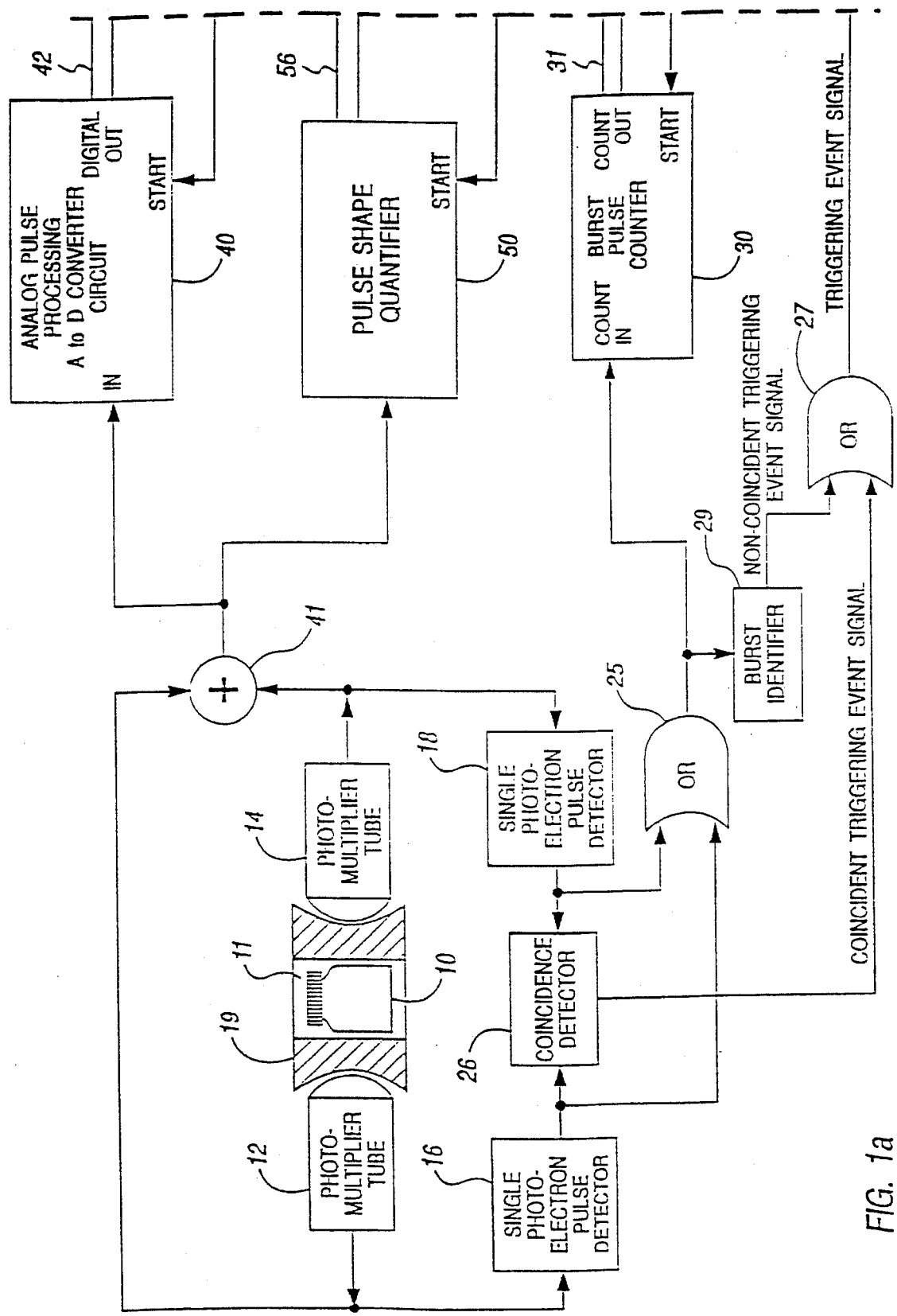
FIG. 1a and 1b are diagrams of an $\alpha$-$\beta$-$\gamma$ counter embodying the invention.
Figure 1B:
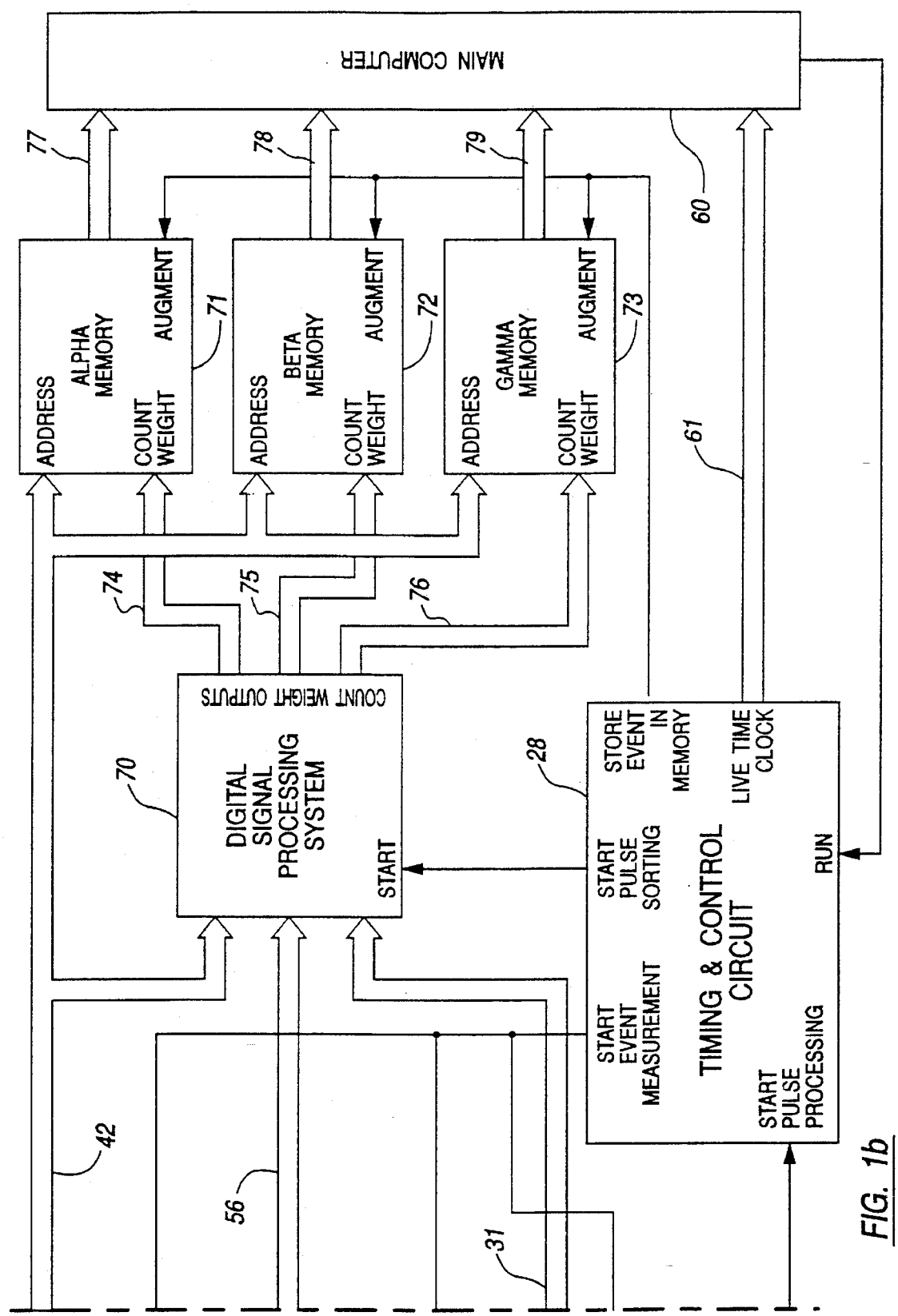

Referring now to FIG. 1a and 1b, a sample 10 to be measured is positioned in a shielded sample well 11 located between a pair of photomultiplier tubes (PMTs) 12 and 14 utilized to detect optical events. The sample 10 may be a liquid scintillation sample contained in a glass or plastic vial so that the PMTs 12 and 14 can detect photons emitted by the liquid scintillator in response to radioactive decay events in the sample. Liquid scintillators are normally used with $\alpha$ or $\beta$ emitting samples because these types of radiation are often so weak that the scintillator must be in close proximity to the sample. As the radionuclide in the sample decays, $\alpha$ or $\beta$ particles are emitted and act to energize the fluor in the liquid scintillator. The fluor converts the energy from $\alpha$ or $\beta$ particles into photons which are detected by the PMTs, and the PMTs 12 mid 14 generate analog electrical pulses representative of the detected optical events. The outputs of the PMTs are sensed and transformed to one-bit digital formats by a pair of single photoelectron pulse detectors 16 and 18, which are essentially amplitude comparators operating with an appropriate reference voltage.

Located between the sample 10 and the faces of the PMTs 12 and 14 is a solid scintillator 19 in the form of a cylinder with concave end surfaces and a hole cut diametrically through the center of the cylinder. This solid scintillator 19 is preferably transparent so that it does not significantly attenuate photons transmitted from a liquid scintillator sample 10 to the PMTs 12 and 14. The purpose of the solid scintillator is to detect radiation leaving the sample vial. Such radiation typically originates from a γ emitter, because γ rays are sufficiently strong that they are able to penetrate the glass or plastic sample vial and have sufficient energy to energize the solid scintillator 19 even though this scintillator is spaced a slight distance away from the sample.

The solid scintillator 19 is also used as an active guard shield, in the same manner described in detail in U.S. Pat. No. 5,146,093. An active guard shield is used to improve the ability of the counting system to discriminate between α or β sample events being measured and unwanted background events.

The solid scintillator 19 is preferably a bismuth germanate (BGO) crystal such as $Bi_4 Ge_3 O_{12}$. This material is commercially available and is widely used in γ-ray detectors, XCT (X-ray computerized tomography), PET (position emission tomography), electromagnetic shower colorimeters, oil well logging and other applications. BGO crystals can be machined to the desired size and shape, and can be made to be highly transparent at the wavelengths of the light emitted by most liquid scintillators in response to α or β emissions. BGO crystals also have a low afterglow, which is advantageous because the afterglow of a scintillator can interfere with detection of weak β emissions. Additionally, BGO crystals have a relatively high density (7 $g/cm^3$) which enables the solid scintillator to absorb a high percentage of the γ rays impinging thereon, whether from the sample or from background events such as cosmic rays. This contributes to high γ counting efficiency and enhanced background rejection.

The intensity of the light emitted by BGO crystals is relatively low, which is advantageous when detecting high-energy γ rays. When detecting low-energy γ rays, discrimination between wanted and unwanted signals can be effected electronically, as described in more detail below.

The BGO crystal preferred for use in the present invention is $Bi_4 Ge_3 O_{12}$ that is substantially free of impurities and that is annealed after machining. Annealing of the BGO crystal at 250° C. for 2.5 hours in the dark reduces thermoluminescent noise, and improves light output and optical transmission.

Figure 6A:
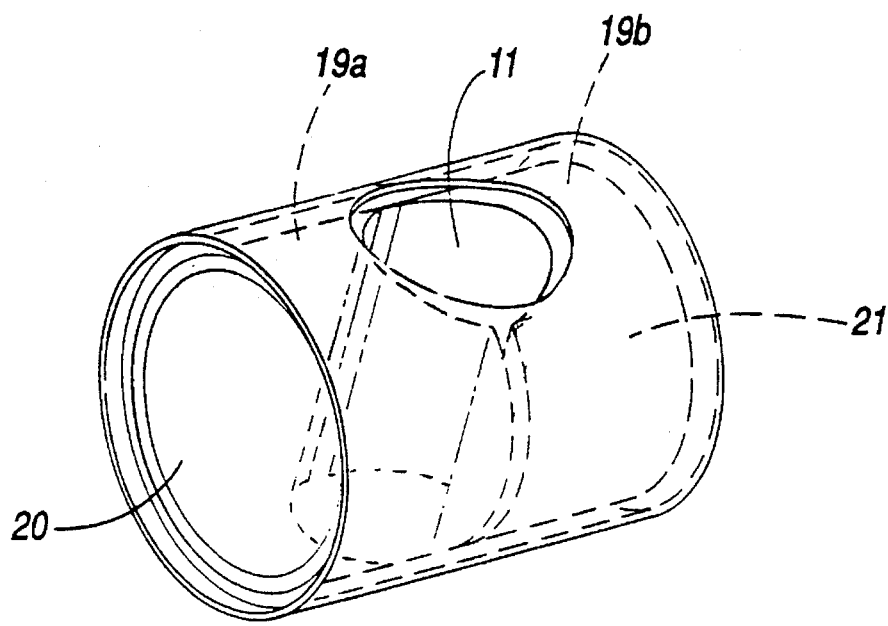
FIG. 6a is a perspective view of the solid scintillator used in the system of FIG. 1.
Figure 6B:
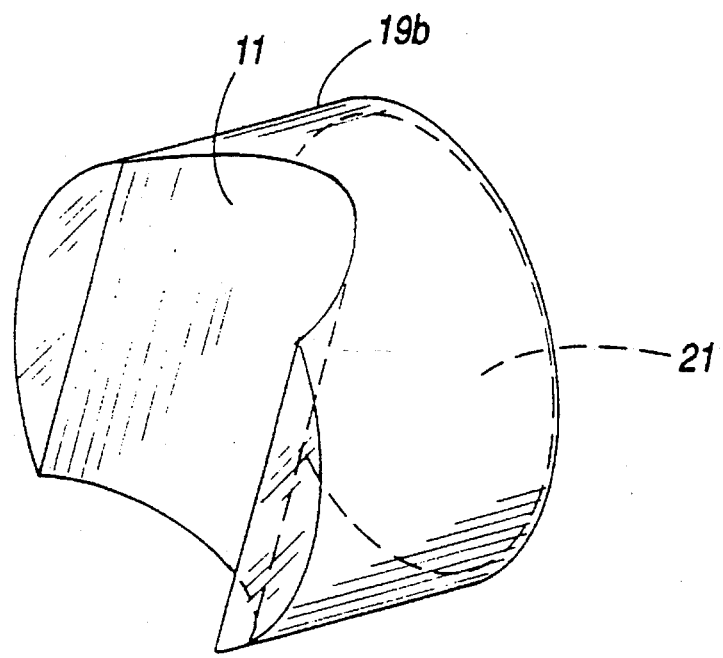
Figure 7:
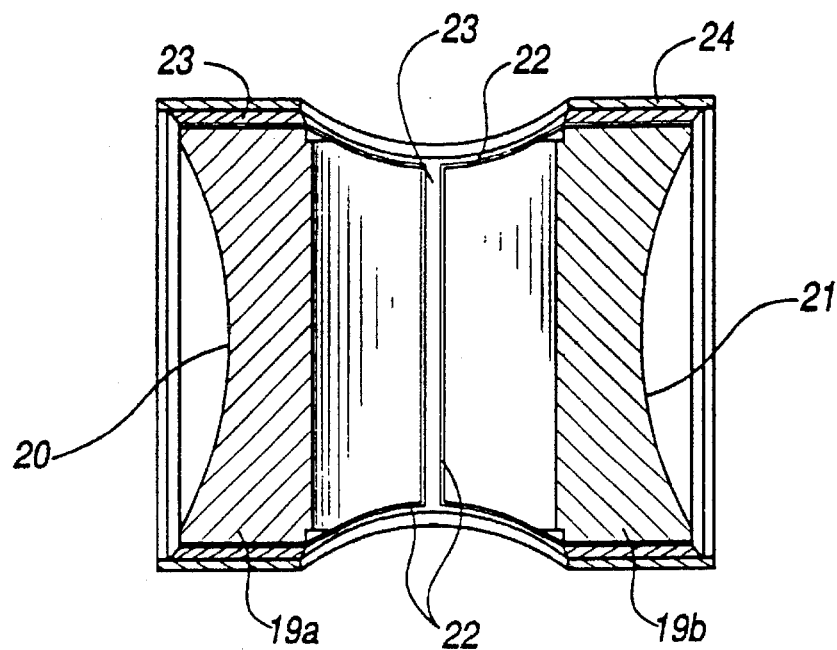
FIG. 7 is an enlarged section taken longitudinally through the center of the scintillator assembly of FIG. 1.
Figure 8:
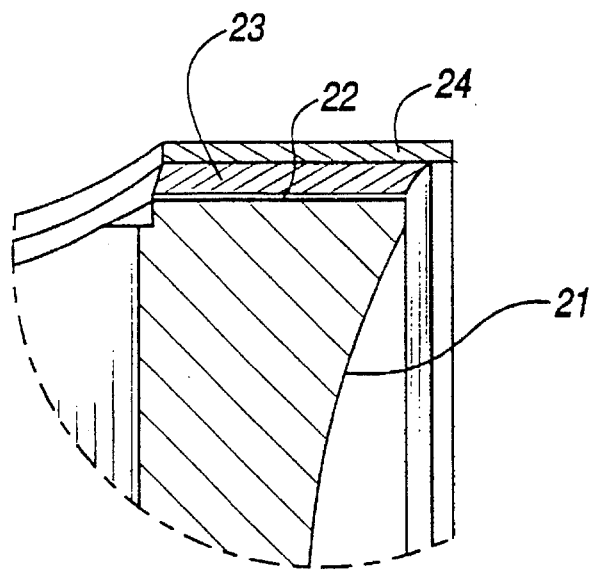
FIG. 8 is an enlargement of the upper right hand corner of the section shown in FIG. 7.

As illustrated in FIGS. 6–8, the BGO crystal is cylindrical and constructed in two segments 19a and 19b. A central hole extends transversely through the cylinder to form the sample well 11 into which a sample vial may be placed. The sides of the sample well are polished arid are optically clear to permit scintillation light from the sample to enter the BGO crystal. The polished ends 20 and 21 of the crystal are concave to receive the convex faces of the two PMTs 12 and 14. A thin reflector 22 covers all the external surfaces of the crystal except the polished ends and the transverse hole (sample well). The purpose of the reflector 22 is to ensure that a maximum number of scintillation photons reach the PMTs. The reflecting material is also provided on the adjoining surfaces of the two crystal segments 19a and 19b to help prevent optical cross-talk between the PMTs. Surrounding the crystal segments and their reflective coatings is a potting compound 23 such as silicone, which also fills the gap between the two crystal sections. Finally, surrounding the potting material, is a metal housing 24 to ensure a light-tight structure.

Returning now to FIG. 1, photons from either the solid scintillator 19 or a liquid scintillator within the sample 10 are detected by one or both of the PMTs 12 and 14. The resulting output pulses from the PMTs are converted to digital pulses, called the "singles" pulses, by the single photoelectron pulse detectors 16 and 18. Each singles pulse represents the fact that an analog pulse of at least a single photoelectron amplitude has been detected. These digital pulses are directed to both an OR gate 25 and a coincidence detector 26. The OR gate 25 acts to sum singles pulses received from both the single photoelectron pulse detectors 16 and 18 and delivers that signal, called the "summed singles" signal, as an input to a burst identifier 29 and a burst pulse counter 30. The coincidence detector 26 determines when singles pulses are produced substantially simultaneously by both detectors 16 and 18, and in response thereto transmits a coincidence signal through an OR gate 27 to a timing and control circuit 28. The result is to reject spurious noise pulses from the PMTs and provide a start signal to the timing and control circuit 28 when a coincident triggering event occurs.

The purpose of the burst identifier 29 is to determine whether non-coincident optical events detected by the PMTs 12 and 14, and the corresponding single photoelectron pulse detectors 16 and 18, represent an event detected by the BGO crystal. This function is similar to that of the burst identifier described in U.S. Pat. No. 4,528,450, and the burst identifier 29 may be implemented in the same manner described in that patent. The burst identifier 29 is particularly useful in rejecting spurious noise pulses produced by the PMTs, and in accepting events that produce non-coincident scintillation pulses from the two segments of the solid scintillator 19. The decay constant of the solid scintillator 19 is much greater than that of most liquid scintillators, and γ rays impinging on the two segments of the solid scintillator can result in non-coincident pulses from the PMTs.

When non-coincident pulses are caused by a γ-induced scintillation from the solid scintillator 19, the output signals from the PMTs are actually a burst of pulses over a time interval which is long compared to the duration of a noise pulse. For example, the burst identifier 29 may be designed to recognize non-coincident pulses as a γ event only when three or more pulses occur within 400 ns. All other non-coincident pulses are considered to be noise.

Whenever the burst identifier 29 recognizes non-coincident pulses as a γ event, it produces a non-coincident-triggering-event signal which is passed through the OR gate 27 to the timing and control circuit 28. Such signals have the same effect as the coincident-triggering-event signals from the coincidence detector 26, i.e., they set the circuit 28 to start the systems that measure and evaluate the current triggering event. Thus, event measurement and evaluation is initiated by the detection of either a coincident or a non-coincident triggering event, as described in detail below.

If desired, the burst identifier 29 can be replaced by the use of a longer coincidence-sensing interval in the coincidence detector 26.

The timing and control circuit 28 consists of an event latch, a sample counting timer, and a store pulse generator. The event signal from the OR gate 27 sets a latch, if the latch is not busy. Once set, this latch sends a "start-event-measurements" signal to three event measurement systems 30, 40 and 50, described in detail below. The latch also sends a signal to the sample counting timer within the circuit 28 indicating that sample counting time is inhibited. This sample counting timer is started, stopped, mid reset by a signal from a main computer 60. The sample counting timer also provides the main computer 60 with the sample counting time via bus 61. After a fixed time delay, the timing and control circuit 28 sends a "start-pulse-sorting" signal to a digital signal processing system 70. After another fixed time delay (relative to sending the start-pulse-sorting pulse) the timing and control circuit sends a "store event" signal to histogramming memories 71, 72 and 73 to store the values produced by the digital signal processing system 70.

The first of the three event measurement systems is the burst counter 30, which tracks the outputs of the PMTs for a predetermined time before, during and after the detection of a triggering event to detect and count all singles pulses generated by a scintillation event. During this counting period, all pulses from the single photoelectron pulse detectors 16 and 18 are passed through the OR gate 25 to the burst pulse counter 30. The number of singles pulses detected in the pulse burst (the burst count) within a predetermined time period (typically 5 microseconds) encompassing a triggering event signal is utilized by the digital signal processing system 70 to determine whether the optical event corresponding to the triggering pulse is an $\alpha$, $\beta$ or $\gamma$ event, or to determine the probability that the detected event is an $\alpha$, $\beta$ or $\gamma$ event.

The burst pulse counter 30 is a combination of a delay line, a gated counter and a timer. The counter is originally set to zero. The start pulse from the circuit 28 starts the timer, and the timer enables the counting gate and permits summed singles which have been delayed by the delay line to be counted. The counting of summed singles (burst counts) continues until the timer times out (approximately 5 microseconds later) and the counting gate is disabled. The counted value is then held in the counter and on a bus 31 until the start pulse is terminated.

Since the detection of a non-coincident pulse event requires the detection of several summed singles (burst pulses) by the burst identifier 29 before a "start event measurement" pulse can enable the counting gate of the burst pulse counter 30, the initial summed singles pulses of the event could not be counted by the burst pulse counter 30 unless some means was employed to recover the summed singles counts that had occurred before detection of a non-coincident event had been established. To accomplish this, a digital delay circuit is inserted at the count input of the burst pulse counter so that summed singles pulses are delayed by a time interval equal to at least the burst evaluation time interval employed by the burst identifier 29 (approximately 100 to 800 nanoseconds). This permits the counting of summed singles pulses that have occurred before the non-coincident triggering event signal has been generated and includes the summed singles pulses that trigger the burst identifier 29 as well as the coincident pulse that triggers the coincidence detector 26 in the case of a coincident pulse event.

The second event measurement system is a conventional analog pulse-processing and analog-to-digital conversion system 40, which receives the output pulses from the PMTs 12 and 14 through a summing junction 41. This system 40 acts to integrate the analog pulses and to provide a digital output signal indicative of the energy level of each pulse. This output signal, typically a 12-bit signal, is supplied to a data bus 42.

Figure 2:
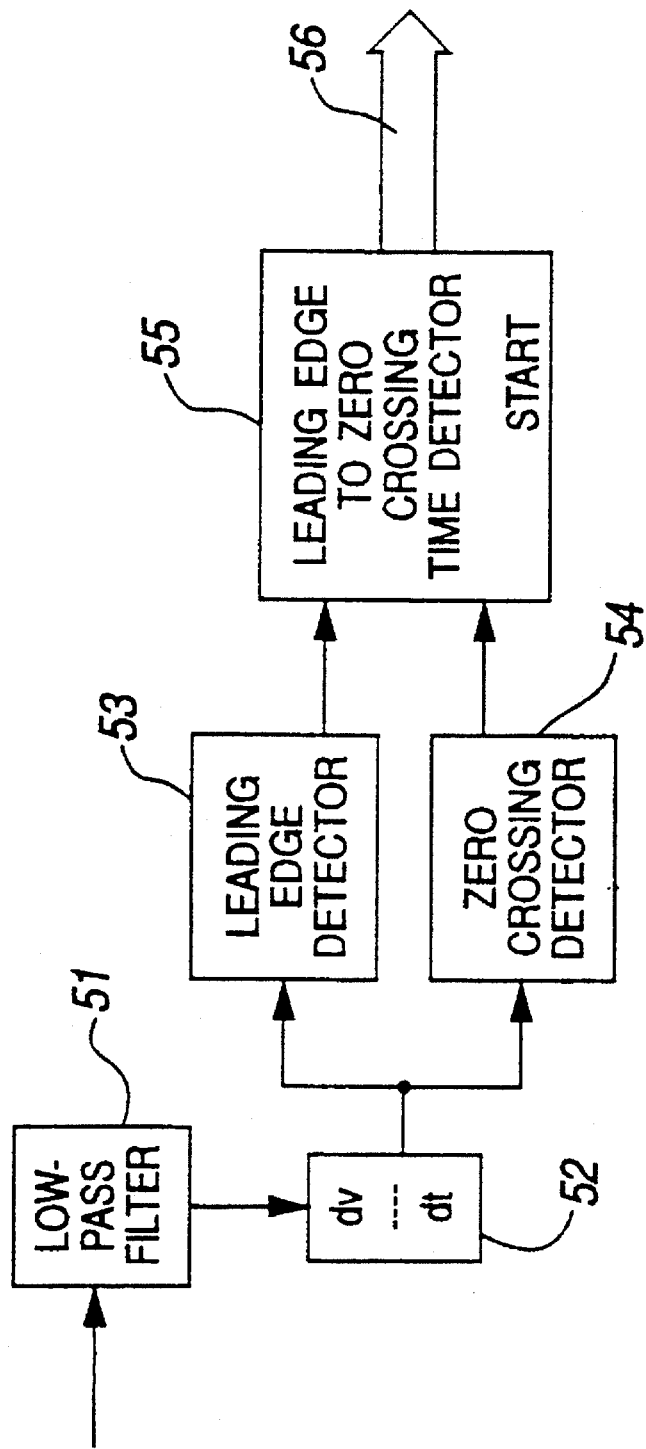
FIG. 2 is a more detailed block diagram of the pulse shape quantifier system in the counter of FIG. 1.
Figure 3:
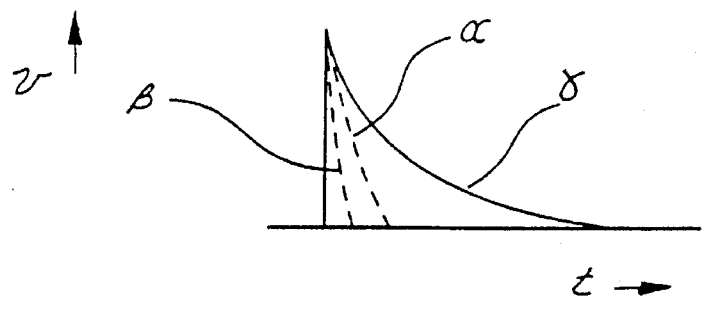
FIG. 3 is a diagrammatic illustration of PMT output pulses representing $\alpha$, $\beta$ and $\gamma$ events.

The third event measurement system is a pulse shape quantifier system 50, which is shown in more detail in FIG. 2. Like the system 40, the system 50 receives the PMT output pulses from the summing junction 41. FIG. 3 illustrates the relative timing of three PMT output pulses representing $\alpha$, $\beta$ and $\gamma$ events, and it can be seen that all the pulses have fast rise times, and then decay exponentially. It can also be seen that the $\beta$ pulses decay most quickly, followed by the $\alpha$ pulses, and then the $\gamma$ pulses.

Figure 4:
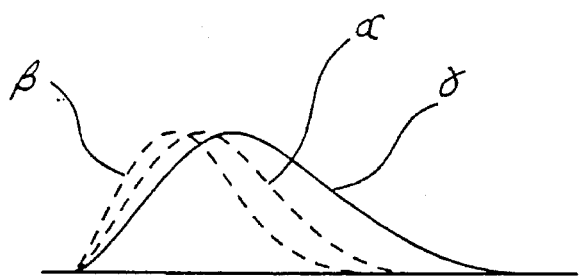
FIG. 4 is a diagrammatic illustration of the three pulses of FIG. 3 after being filtered.

To permit discrimination among the times of occurrence of the peaks of different pulses, the output pulses from the PMTs are initially passed through a series of low-pass filters 51 (FIG. 2) to produce pulse shapes resembling those depicted in FIG. 4. It can be seen that the $\beta$ pulses peak the earliest, then the $\alpha$ pulses, and finally the 31 pulses.

The peaks of all the low pass filtered pulses produced by the same type of radioactivity, e.g., $\beta$ particles, always occur at the same time interval from the leading edge of the pulse, regardless of the amplitude of the pulse. That is, different $\beta$ emitters have different energy levels, producing scintillations of different intensities, but the peak of any pulse produced in response to $\beta$ emission will always occur at the same time interval from the leading edge of the pulse. Thus, the time of occurrence of the peak of a pulse may be used to determine whether the pulse represents an $\alpha$, $\beta$ or $\gamma$ event.

Figure 5:
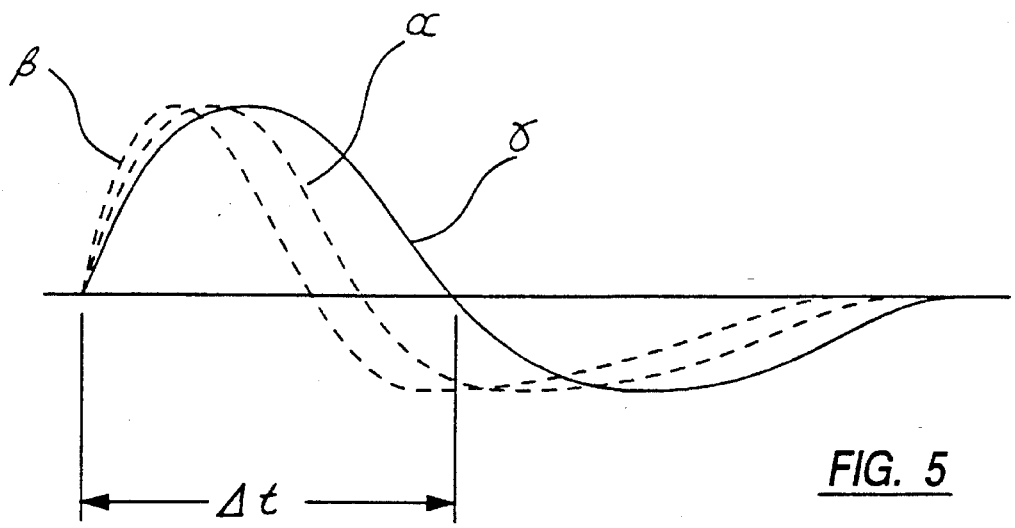
FIG. 5 is a diagrammatic illustration of the three pulses of FIG. 3 after being filtered and differentiated.

To facilitate the measurement of the times of occurrence of the pulse peaks, the pulses are passed through a differentiator 52 (FIG. 2) to produce pulse shapes resembling those depicted in FIG. 5. The times at which these pulses cross zero correspond to the times of occurrence of the peaks of the pulses in FIG. 4. Thus, the time of occurrence of each pulse peak can be measured as the time interval $\Delta t$ between the leading edge of the pulse and the time at which the derivative of that pulse crosses zero. To this end, the pulse shape quantifier system 50 includes a leading edge detector 53 and a zero-crossing detector 54, connected in parallel.

Using the times detected by the two detectors 53 and 54, a detector 55 determines the time interval $\Delta t$ between the leading edge and the peak of each pulse. The resulting output signal, representing $\Delta t$, is supplied to a data bus 56, and is ultimately used to make a tentative determination of whether the pulse represents an $\alpha$, $\beta$ or $\gamma$ event.

The data on the three buses 31, 42 and 56 is supplied to the digital signal processing system 70. Thus, the digital signal processing system 70 receives burst count information from the counter 30, pulse energy information from the circuit 40 and leading edge to zero crossing time information from the pulse shape quantifier system 50. The timing and control circuit 28 also furnishes the digital signal processing system 70 with a signal that indicates when evaluation of the event measurement information is to be carried out, following each triggering event signal from the OR gate 27. The digital signal processing system 70 is programmed to use all this information, in conjunction with stored look-up tables, to make a decision as to whether a pulse represents an $\alpha$, $\beta$ or $\gamma$ event. If desired, the digital signal processing system 70 can be programmed to make a weighted decision, as to the probabilities that a pulse represents an $\alpha$, $\beta$ or $\gamma$ event.

Figure 9:
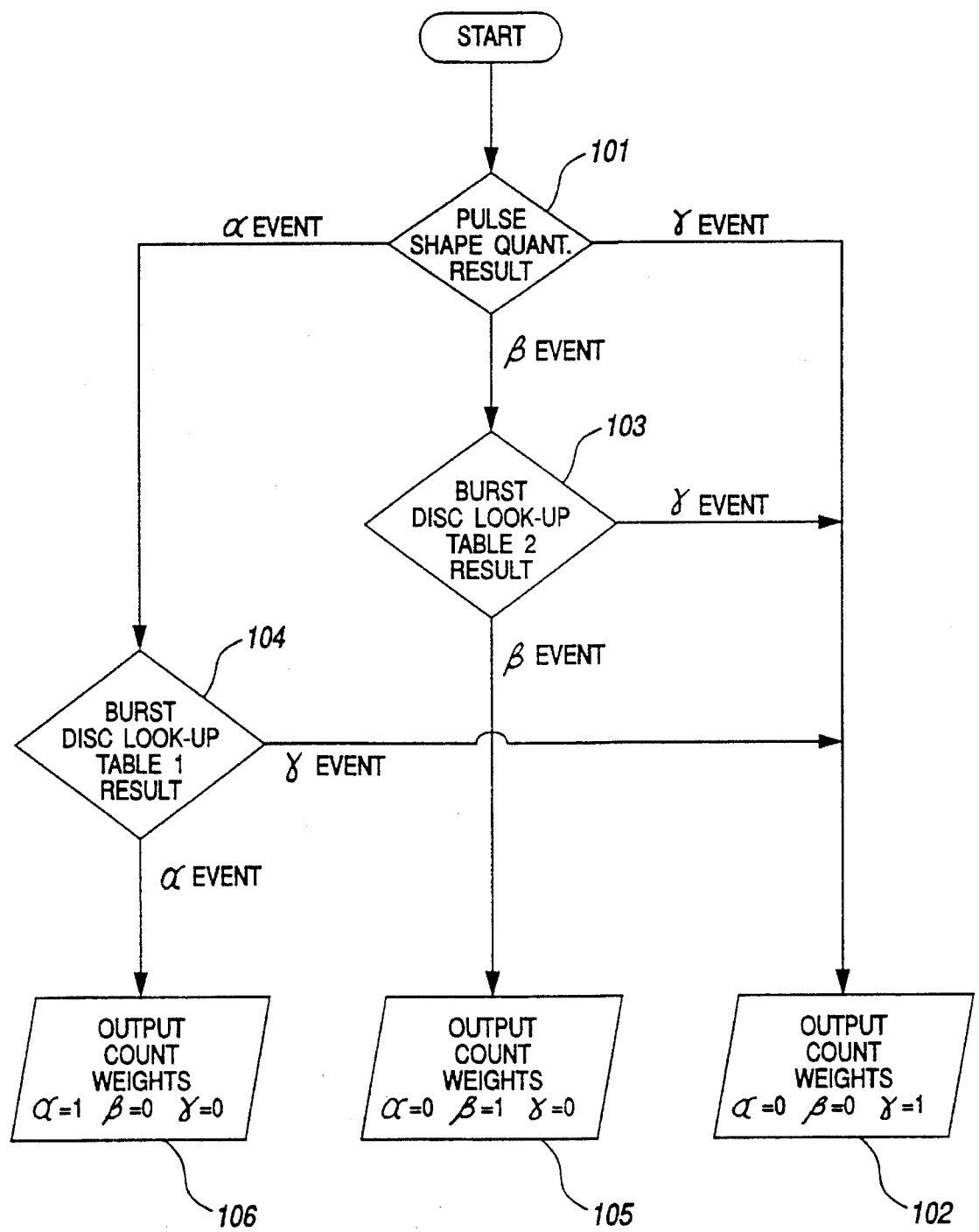
FIG. 9 is a flow chart of a preferred algorithm executed by the digital signal processing system in the counter of FIG. 1.

One algorithm that can be used by the digital signal processing system 70 is illustrated in FIG. 9. This is a classical type of flow chart where only one path is taken to reach one of three results. In this algorithm, a detected event can only be designated as an $\alpha$, $\beta$, or $\gamma$ event, with a count weight equal to one. In this "unity count weight" configuration, a tentative decision classifying events as $\alpha$, $\beta$ or $\gamma$, based on the pulse shape quantifier data, is subject to confirmation by the burst count and pulse energy information, which may dictate reclassification of an $\alpha$ or $\beta$ event as a $\gamma$ event.

Specifically, step 101 of the algorithm of FIG. 9 receives the pulse shape quantifier data (the leading edge to zero crossing time value) from bus 56 and makes a tentative decision as to whether the event is an α, β, or γ event. For example, if the measured peak time interval Δt on bus 56 is less than $t_1$ (e.g., less than 900 nanoseconds), the pulse is considered a β pulse. If Δt is greater than $t_1$ but less than (e.g., between 900 and 1000 nanoseconds), the pulse is considered an α pulse. If Δt is greater than $t_2$ (e.g., greater than 1000 nanoseconds), the pulse is considered a γ pulse.

If step 101 determines that the current event is a γ event, a count weight of one is provided to the γ memory 73 via bus 76 at step 102. If the answer at step 101 is a β event, the system advances to step 103, and if it is an α event, the system advances to step 104.

At step 103 the system uses the current burst count from the bus 31 and the a β or γ event. This determination is preferably made by comparing the current burst count with a predetermined burst count for a pulse energy level corresponding to the current pulse energy level. If the current burst count is below the predetermined value, the event is considered to be a β event and the system advances to step 105 where a count weight of one is provided to the β memory 72 via bus 75. If the current burst count is above the predetermined value, the event is considered to be a γ event and the system advances to step 102 where a count weight of one is provided to the γ memory 73 via bus 76.

The predetermined values stored in the look-up table utilized at step 103 can be determined empirically. The values are preferably selected to optimize the separation of pulses representing β and γ events. Burst count values are preferably stored for pulse energy levels at 0.5 KEV increments. For example, if the energy spectrum to be handled by the system is from 0 to 2000 KEV, the look-up table contains 4000 different burst counts, corresponding to 4000 different pulse energy levels.

At step 104, the system uses the current burst count and pulse energy values from buses 31 and 42 to determine whether the detected event is an α or γ event. Here again, this determination can be made by consulting a look-up table containing predetermined burst count values for multiple pulse energy values. Whether the current burst count is below or above the stored value determines whether the event is considered an α or γ event. If it is an α event, the system advances to step 106 where it provides a count weight of one to the α memory 71 via bus 74. On the other hand, if it is a γ event, the system advances to step 102 to provide a count weight of one to the γ memory 73 via bus 76.

Figure 10:
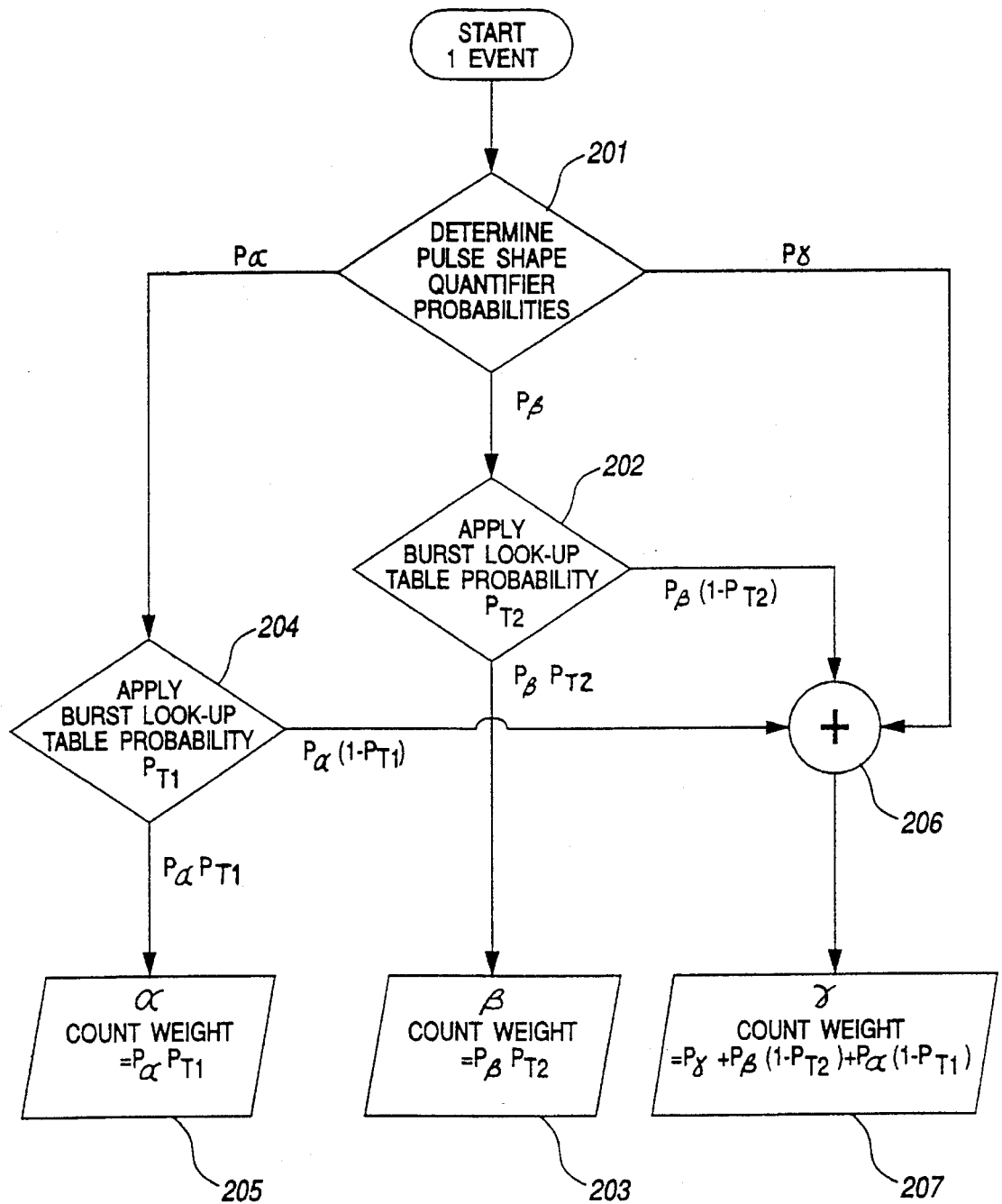
FIG. 10 is a flow chart of an algorithm which is an alternative to the algorithm of FIG. 9.

The fractional count method is described by the flow chart in FIG. 10 which is a non-traditional flow chart. In this methodology, the algorithm executed by the digital signal processing system 70 assigns probabilities to the sorting decisions, and data flows along all paths. A pulse shape look-up table assigns probabilities based on the leading edge to zero crossing time Δt measured by the pulse shape quantifier 50, and the burst count look-up tables assign probabilities based on the burst count and energy of the event. The end result is a series of count weights that are assigned to each type of pulse classification based upon the certainty of the classification decision being correct. The sum of the resulting α, β, and γ count weights from a single event is one.

Specifically, referring to FIG. 10, step 201 receives the peak time Δt from the pulse shape quantifier system 50 and makes an initial determination of the probabilities of that data representing an α, β or γ event ($P_\alpha$, $P_\beta$ and $P_\gamma$). In this step, the system uses the peak time Δt, determined in the pulse shape quantifier system 50, to determine the probabilities of the event being an α, β or γ. This determination is made from a look-up table which stores probability values for α, β and γ events at multiple Δt values. These probability values can be determined empirically. At low Δt values up to a value $\Delta t_1$, the β probability $P_\beta$ is 100%, and the α and γ probabilities $P_\alpha$ and $P_\gamma$ are zero. From $\Delta t_1$ up to a value $\Delta t_2$ the β probability $P_\beta$ decreases while the α probability $P_\alpha$ increases. The γ probability $P_\gamma$ remains zero. At $\Delta t_2$ the β probability $P_\beta$ becomes zero, and from $\Delta t_2$ to a value $\Delta t_3$, the α probability $P_\alpha$ is 100%. At a value $\Delta t_4$ the γ probability $P_\gamma$ becomes finite and increases until it reaches 100% at a value $\Delta t_5$. The a probability $P_\alpha$ drops from $\Delta t_4$ to $\Delta t_5$ and reaches zero at $\Delta t_5$. The β probability $P_\beta$ remains zero at all values above $\Delta t_2$.

At step 202, the system multiplies the β probability $P_\beta$ from step 201 by a β burst look-up table probability ($P_{T2}$) to produce the β count weight. That is, the β count weight equals ($P_\beta \cdot P_{T2}$). In this step, the system uses a table containing burst counts and corresponding pulse energy levels. Based upon these two entries, the table produces a predetermined probability $P_{T2}$ that the current burst count and energy level represent a β event. Step 203 provides this count weight to the β memory 72 via bus 75.

Another path from step 201 leads to step 204 where the system multiplies the α probability $P_\alpha$ from step 201 by an α burst look-up table probability ($P_{T1}$) to produce the α count weight. That is, the α count weight equals ($P_\alpha \cdot P_{T1}$). In this step, the system again uses a table containing burst counts and corresponding pulse energy levels. Based upon these two entries, the table produces a predetermined probability $P_{T1}$ that the current burst count and energy level represent an α event. Step 205 provides this count weight to the α memory 71 via bus 74.

Step 202 also multiplies the β probability $P_\beta$ and the value $(1-P_{T2})$ to produce a value for the probability that the event is a γ rather than a β. This value $P_\beta \cdot (1-P_{T2})$ is supplied to a summing junction 206. Similarly, step 204 multiplies the α probability and the value $(1-P_{T1})$ to provide the summing junction 206 with a value $P_\alpha \cdot (1-P_{T1})$ for the probability that the event is a γ rather than a α. These two values, together with the γ probability $P_\gamma$ from step 201, are summed at the summing junction 206, and the resulting sum $P_\gamma + P_\beta(1-P_{T2}) + P_\alpha(1-P_{T1})$ is provided as a α count weight to the γ memory 73 at step 207.

The functionality of the second algorithm can be illustrated by an example in which the value at Δt is such that step 201 determines that the event has a 25% chance of being a γ pulse, a 75% chance of being an α pulse, and a 0% chance of being a β pulse. That is $P_\gamma=0.25$, $P_\beta=0.75$, and $P_\beta=0.00$. With these values, step 202 will produce a β count weight of zero for step 203 because $P_\beta \cdot P_{T2}=0$. Thus, the β count weight provided to the β memory 72 is zero. Step 202 also gives a result of zero to the summing junction 206 because $P_\beta \cdot (1-P_{T2})$ is zero. Assuming that the burst look-up table $T_1$ designates this event as having a 50% chance of being an α ($P_{T1}=0.5$), step 204 produces an α count weight of 0.375 because $P_\alpha \cdot P_{T1}=(0.75) \cdot (0.5)=0.375$. Step 205 provides this result to the α memory 71. Also, step 204 gives a value of 0.375 to the summing junction 206 because $P_\alpha \cdot (1-PT^{T1})=(0.75) \cdot (1-0.5)=0.375$. The summing junction 206 then forms the γ count weight which it provides to step 207. In our example, $P_\gamma + P_\beta(1-P_{T2}) + P_\alpha(1-P_{T1})=0.25+0+0.375=0.625$. Step 207 provides this result to the γ memory 73.

A human operator is responsible for determining whether the γ count weight is to be interpreted as a valid event or as background radiation. For example, if the only events of interest to the operator are α and β events, the operator would treat the γ results as background. If desired, a combination of the unity and fractional count processing functions may be utilized in the operation of the digital signal processing system 70. For example, pulse shape quantification may output unity weight results which are then weighted by a fractional value from burst discrimination look-up tables.

Memories 71, 72, and 73 have addresses which represent particular energy levels. The contents of each address represent the cumulative count weight for a particular energy level. The timing and control circuit, as described above, provides the signal which will augment the memory values. These memories then provide a spectrum of values to the main computer 60 over buses 77, 78, and 79.

I claim:

1. A scintillation measurement system for measuring optical events produced by a scintillator in response to the radioactive decay of a constituent or constituents of a sample to be measured, said system comprising:

means for supporting the sample in a sample well, a bismuth germanate scintillation crystal located adjacent the sample well, a plurality of photodetectors located outside the bismuth germanate crystal for detecting optical events occurring in the sample well or in the bismuth germanate crystal and converting said optical events into electrical pulses, and pulse analyzing means for receiving the electrical pulses from said photodetectors and determining whether such pulses represent alpha, beta or gamma events.

2. The scintillation measurement system of claim 1 which includes triggering means for receiving the electrical pulses from said photodetectors and determining which pulses are to be analyzed, and wherein said pulse analyzing means is responsive to said triggering means and includes means for determining the energy level of said electrical pulses, means for filtering said electrical pulses and determining the time between the leading edges and the peaks of the filtered pulses (the "peak time"), means for determining the number of pulses occurring within an event to be analyzed (the "burst count"), and evaluation means for determining, in response to the pulse energy level, the peak time, and the burst count, the extent to which said electrical pulses should be treated as α, β or γ events.

3. The scintillation measurement system of claim 2 wherein said evaluation means includes tables of burst count values corresponding to multiple pulse energy values for discriminating between β and γ events, and between α and γ events.

4. The scintillation measurement system of claim 3, which includes means responsive to said peak time for determining which table to use to determine whether a detected pulse should be treated as a γ event.

5. The scintillation measurement system of claim 3 wherein said tables include probability values for α, β and γ events for each combination of a pulse energy value and a burst count value, and which includes means responsive to said peak time for determining tentative probabilities that a pulse represents an α, β or γ event, and means responsive to said tentative probabilities as well as the pulse energy level and the burst count, for adjusting the probability values stored in said tables.

6. The scintillation measurement system of claim 2 wherein said triggering means includes means for triggering said pulse analyzing means in response to either the coincident detection of pulses at two photodetectors, or the detection of a burst of pulses at one or more photodetectors within a selected time interval.

7. The scintillation measurement system of claim 2 wherein said means for determining the peak time includes means for filtering and differentiating said electrical pulses, and means for measuring the time between the leading edge and the zero crossing of the differentiated pulses.

8. The scintillation measurement system of claim 2 which includes means for determining whether the peak time of a pulse correlates with an α, β or γ event.

9. The scintillation measurement system of claim 1 wherein said pulse analyzing means includes means for discriminating among:

a) pulses representing photons emitted by a liquid scintillator in the sample well in response to β emissions from the sample, b) pulses representing photons emitted by a liquid scintillator in the sample well in response to α emissions from the sample, and c) pulses representing photons emitted by the bismuth germanate crystal in response to γ emissions from the sample.

10. The scintillation measurement system of claim 1 wherein said bismuth germanate crystal is in the form of a cylinder extending between the faces of a pair of opposed photodetectors, said cylinder having a bore extending through the central portion thereof, transverse to the axis of the cylinder, to form the sample well.

11. The scintillation measurement system of claim 10 which includes a reflector extending through the cylindrical crystal, through the axis of the sample well, and transverse to the axis of the cylinder, to prevent cross-talk between the pair of opposed photodetectors.

12. The scintillation measurement system of claim 1 wherein said bismuth germanate crystal is transparent to scintillations emitted by a scintillator within the sample well so that said scintillations can be detected by said photodetectors.

13. A scintillation measurement method for measuring optical events produced by a scintillator in response to the radioactive decay of a constituent or constituents of a sample to be measured, said method comprising:

positioning the sample in a sample well having a bismuth germanate scintillation crystal located adjacent the sample, detecting optical events occurring in the sample or in the bismuth germanate crystal and converting said optical events into electrical pulses, analyzing the electrical pulses to determine the energy level of the pulses, the time between the leading edges and the peaks of the pulses after the pulses are filtered (the "peak time"), and the number of pulses occurring within an event to be analyzed (the "burst count"), and evaluating the results of the analyzing step to determine the extent to which the pulses should be treated as α, β or γ events.

14. The method of claim 13 which includes the step of determining which pulses are to be analyzed prior to the analyzing step.

15. The method of claim 14 wherein pulses to be analyzed are identified either by the coincident detection of optical events at two different photodetectors, or by the detection of a burst of optical events at one or more photodetectors within a selected time interval.

16. The method of claim 15 wherein the evaluating step includes looking up the current analyzed values of burst count and energy level in a predetermined table of such values and the types of radiation events corresponding to the different sets of values.

17. The method of claim 13 wherein the evaluating step includes the step of looking up the current analyzed peak time in a predetermined table of such values and the types of radiation events corresponding to the different peak time values.

18. The method of claim 13 wherein the sample contains a low-energy β-emitting isotope.

19. The method of claim 13 wherein the sample contains at least two different isotopes selected from the group consisting of α-emitting isotopes, β-emitting isotopes, and γ-emitting isotopes.

20. A scintillation measurement system for measuring optical events produced by a scintillator in response to the radioactive decay of a constituent or constituents of a sample to be measured, said system comprising:

means for supporting the sample in a sample well, a bismuth germanate scintillation crystal located adjacent the sample well and circumscribing the sample well, at least two photodetectors on opposite sides of the sample well and outside the bismuth germanate crystal for detecting optical events occurring in the sample well or in the bismuth germanate crystal and converting said optical events into electrical pulses, pulse analyzing me:ms for receiving the electrical pulses from said photodetectors and determining whether such pulses represent alpha, beta or gamma events.

21. A scintillation measurement system for measuring optical events produced by a scintillator in response to the radioactive decay of a constituent or constituents of a sample to be measured, said system comprising:

means for supporting the sample in a sample well, a bismuth germanate scintillation crystal located adjacent the sample well, a plurality of photodetectors located outside the bismuth germanate crystal for detecting optical events occurring in the sample well or in the bismuth germanate crystal and converting said optical events into electrical pulses, pulse analyzing means for receiving the electrical pulses from said photodetectors and determining whether such pulses represent alpha, beta or gamma events, means for determining the energy level of said electrical pulses, means for filtering said electrical pulses and determining the time between the leading edges and the peaks of the filtered pulses (the "peak time"), means for determining the number of pulses within an event to be analyzed (the "burst count"), and evaluation means for determining, in response to the pulse energy level, the peak time, and the burst count, the extent to which said electrical pulses should be treated as α, β or γ events.

* * * * *